(12) United States Patent
Hsiao et al.

(10) Patent No.: US 9,632,367 B2
(45) Date of Patent: Apr. 25, 2017

(54) DISPLAY PANELS

(71) Applicant: InnoLux Corporation, Miao-Li County (TW)

(72) Inventors: Yi-Chen Hsiao, Miao-Li County (TW); Chao-Hsiang Wang, Miao-Li County (TW); Yi-Ching Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/710,985

(22) Filed: May 13, 2015

(65) Prior Publication Data
US 2016/0131932 A1    May 12, 2016

(30) Foreign Application Priority Data
Nov. 11, 2014    (TW) .............................. 103138990 A

(51) Int. Cl.
*G02F 1/1339*    (2006.01)
*G02F 1/1337*    (2006.01)

(52) U.S. Cl.
CPC .... *G02F 1/13394* (2013.01); *G02F 1/133707* (2013.01)

(58) Field of Classification Search
CPC .......................... G02F 1/13394; G02F 1/13392
USPC .................................................. 349/155, 156
See application file for complete search history.

(56) References Cited

U.S. PATENT DOCUMENTS 5,499,128 A * 3/1996 Hasegawa ........... G02F 1/13394
349/155
6,724,457 B1 * 4/2004 Sunohara ............ G02F 1/13394
349/155
2006/0158602 A1 * 7/2006 Toyoda ............. G02F 1/133512
349/189
2007/0121051 A1 * 5/2007 Yokoyama .......... G02F 1/13394
349/156
2010/0195035 A1 * 8/2010 Hirato ................. G02F 1/13394
349/124

FOREIGN PATENT DOCUMENTS

CN            1808227          7/2006

OTHER PUBLICATIONS

Taiwanese language office action dated Mar. 2, 2016, issued in application No. TW 103138990.

* cited by examiner

*Primary Examiner* — Thanh-Nhan P Nguyen
(74) *Attorney, Agent, or Firm* — McClure, Qualey & Rodack, LLP

(57) ABSTRACT

A display panel includes a first substrate, a second substrate and a display medium. At least one spacer is formed on the top surface of the first substrate and is disposed between the first substrate and the second substrate. An alignment film is formed on the first substrate and covers the spacer. The spacer has a first width and a second width in a direction perpendicular to a normal vector of the first substrate. The location of the second width is nearer to the first substrate than that of the first width. The second width is smaller than the first width. The alignment film has a first thickness at the location of the spacer having the first width and has a second thickness at the location of the spacer having the second width. The second thickness is greater than the first thickness.

10 Claims, 4 Drawing Sheets

DISPLAY PANELS

CROSS REFERENCE TO RELATED APPLICATIONS

This application claims priority of the Taiwan Patent Application No. 103138990, filed on Nov. 11, 2014, the entirety of which is incorporated by reference herein.

BACKGROUND

Field of the Invention

The present invention relates to display panel technology, and in particular to spacers of display panels.

Description of the Related Art

Liquid-crystal display (LCD) panels are the primary component in plane displays. An LCD panel basically includes two glass substrates and a liquid-crystal layer sandwiched between the two glass substrates. The two glass substrates are a color filter (CF) substrate and a thin-film transistor (TFT) substrate, respectively. The CF substrate and the TFT substrate are spaced apart from each other by a certain distance. The liquid-crystal layer is filled in the space between the two substrates.

In order to maintain the gap between the two substrates constant, bead spacers of uniform particle diameter are usually dispersed between the two substrates. However, in the manufacturing process of the LCD panels, the bead spacers may contaminate the manufacturing line and introduce defects into the LCD panels. Moreover, the dispersing density of the bead spacers is difficult to control, and thus the dispersing density of the bead spacers is not uniform. The non-uniformity in the dispersing density of the bead spacers causes the gap between the two substrates to be rendered non-uniform. As a result, the quality of the image display of the LCD panels is poor and the production yield thereof is also reduced.

In order to overcome the aforementioned problems of the bead spacers, a photo spacer is developed. The photo spacers are formed by a photolithography process and have better uniformity in dispersing density than the bead spacers to improve the quality of the image display of the LCD panels.

BRIEF SUMMARY

Photo spacers usually have the shape of a cone or a column to support the gap between the CF substrate and the TFT substrate. However, the cone-shaped or the column-shaped photo spacers have a poor elastic recovery. Thus, the number of photo spacers used in LCD panels is great. An increase in the number of photo spacers used in LCD panels will reduce the aperture ratio of the LCD panels, which is disadvantageous to the LCD panels with high resolution.

Accordingly, the disclosure provides an improvement in the structure of spacers used in display panels. The spacer has an undercut structure that is a shrinking structural design at a location near the bottom of the spacer. The undercut structure can increase the elastic recovery of the spacer. Therefore, when the spacers of the embodiments of the disclosure are applied to LCD panels of high resolution, the number of spacers used in the LCD panels is decreased and the aperture ratio of the LCD panels is thereby increased. Moreover, the disclosure provides thickness designs of an alignment film that covers the spacer. The thickness designs of the alignment film can enhance the adhesion between the spacer and the substrate of the LCD panels. Furthermore, the thickness designs of the alignment film are advantageous to the alignment of liquid-crystal molecules in the LCD panels.

In some embodiments of the disclosure, a display panel is provided. The display panel includes a first substrate having a top surface, a second substrate, and a display medium sandwiched between the first and second substrates. The display panel also includes at least one spacer disposed on the first substrate and disposed between the first substrate and the second substrate. The spacer has a first width and a second width in a direction perpendicular to a normal vector of the top surface of the first substrate. The location of the second width is nearer to the first substrate than that of the first width. The second width is smaller than the first width. The display panel further includes an alignment film formed on the first substrate and covering the spacer. The alignment film has a first thickness at the location of the spacer having the first width and has a second thickness at the location of the spacer having the second width. The second thickness is greater than the first thickness.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the contemplated mode of carrying out some embodiments of display panels of the disclosure. This description is made for the purpose of illustrating the general principles of some embodiments of the disclosure and should not be taken in a limiting sense.

It is emphasized that, in accordance with the standard practice in the industry, various features in the accompanying drawings are not drawn to scale. The dimensions of the various features in the accompanying drawings may be arbitrarily increased or reduced for the sake of simplicity and clarity of discussion. Moreover, in the descriptions and the accompanying drawings of the embodiments that follow, the orientations of "on", "over", "above", "under" and "below" are used for representing the relationship between the relative positions of each element in the display panels, and not used to limit the present disclosure. In fact, in the orientation of using the display panels, the CF substrate of the display panels faces the users.

Figure 1:
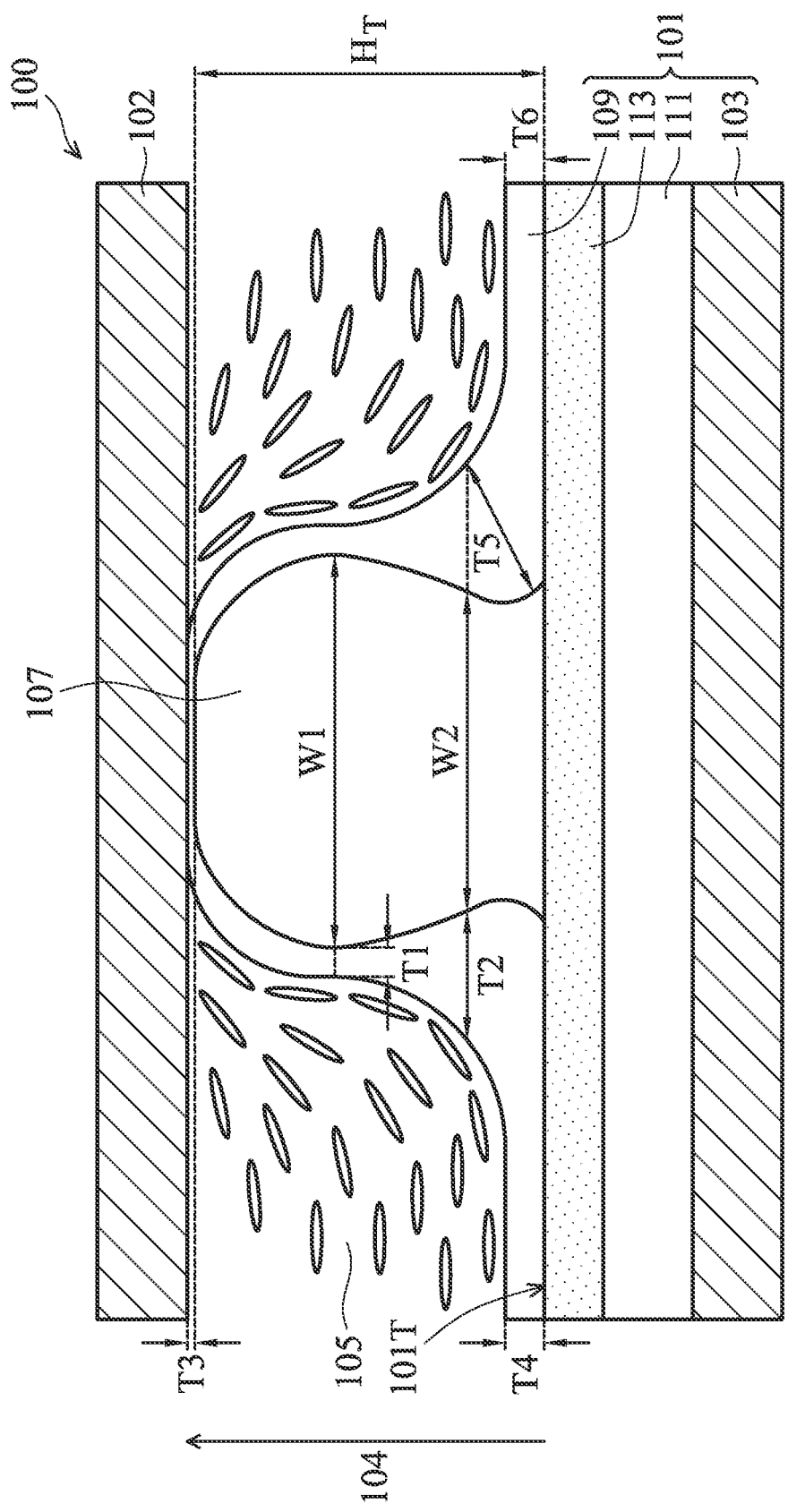
FIGS. 1 to 4 show cross sections of display panels according to some embodiments of the disclosure.

FIG. 1 shows a cross section of a display panel 100 according to some embodiments of the disclosure. The display panel 100 includes a first substrate 101 and a second substrate 102. A display medium 105 is sandwiched between the first substrate 101 and the second substrate 102. In order to maintain a certain distance between the first substrate 101 and the second substrate 102, a spacer 107 is disposed between the first substrate 101 and the second substrate 102. The spacer 107 is formed on the top surface 101T of the first substrate 101. In some embodiments, the spacer 107 is a photosensitive-type and column-shaped spacer. The detailed structural features of the spacer 107 are described below. Although there is only one spacer 107 shown in FIG. 1, in fact, the display panel 100 has several spacers 107 disposed between the first substrate 101 and the second substrate 102.

In some embodiments, the first substrate 101 is a color filter (CF) substrate and the second substrate 102 is a thin-film transistor (TFT) substrate. The first substrate 101, for example the color filter (CF) substrate, includes a color filter layer 111 formed on a transparent substrate 103. The color filter layer 111 includes several color filter components. These color filter components have colors of red, green and blue. In addition, a black matrix (BM) is disposed between the color filter components. A unit of area surrounded by the black matrix is referred to as one sub-pixel area. An area consisting of the color filter components with three different colors, for example red, green and blue color filter components, is referred to as one pixel area.

In addition, a planarization layer (over coating) 113 is formed over the color filter layer 111. In some embodiments, the material of the planarization layer 113 is a transparent photoresist. The planarization layer 113 can protect the color filter layer 111 and has a planarization effect on the color filter layer 111. The difference in height between the red, green and blue color filter components is improved by setting the planarization layer 113. The flatness of the surface of the first substrate (CF substrate) 101 is thereby enhanced. Moreover, in some embodiments, a common electrode (not shown in FIG. 1) is formed over the planarization layer 113. In some embodiments, the material of the common electrode is a transparent conductive material, for example, indium tin oxide (ITO).

There are several TFTs formed on the second substrate (TFT substrate) 102. These TFTs are arranged into an array and each of the TFTs is used as a switch element of one sub-pixel area. In addition, there are several scan lines and several data lines formed on the second substrate (TFT substrate) 102. The scan lines and the data lines are perpendicular to each other. The TFTs are disposed near the intersections of the scan lines and the data lines. The scan lines and the data lines are electrically connected to the TFTs. The TFTs, the scan lines and the data lines are formed by the materials and the fabrication methods which are common in display panels.

Moreover, another planarization layer (not shown in FIG. 1) is formed over the second substrate (TFT substrate) 102. The planarization layer completely covers the TFTs, the scan lines and the data lines. The planarization layer protects all elements on the second substrate (TFT substrate) 102 and enhances the flatness of the surface of the second substrate (TFT substrate) 102. In addition, a pixel electrode (not shown in FIG. 1) is formed over the planarization layer. In some embodiments, the material of the pixel electrode is a transparent conductive material, for example, indium tin oxide (ITO). The pixel electrode is electrically connected to the TFTs by a through hole formed in the planarization layer.

In some embodiments, the display medium 105 is a liquid-crystal layer. In order to make the liquid-crystal molecules in the liquid-crystal layer be arranged in a certain direction, an alignment film 109 is formed on the first substrate 101 and covers the spacer 107. In some embodiments, the material of the alignment film 109 is polyimide (PI). The material for forming the alignment film is coated on the spacer 107 and the first substrate 101 by a coating process. After a film is formed by the material for forming the alignment film, a rubbing treatment is performed to form trenches on the film. As a result, the liquid-crystal molecules in the liquid-crystal layer are arranged in the direction of the trenches on the alignment film 109. Although it is not shown in FIG. 1, another alignment film is formed on the second substrate 102 to make the liquid-crystal molecules in the display medium 105 be arranged in the direction of the trenches on the alignment film over the second substrate 102.

In some embodiments of the disclosure, as shown in FIG. 1, the spacer 107 has an undercut structure so that the bottom of the spacer 107 near the first substrate 101 shrinks inward. The spacer 107 has a cross-section perpendicular to the top surface of the first substrate 101, and the cross-section has the shape of a pillar with a shrinking bottom. The undercut structure can increase the elastic recovery of the spacer 107. Thus, the number of spacers 107 used in the display panel 100 is decreased. The aperture ratio of the display panel 100 is thereby increased. Accordingly, the spacers of the embodiments of the disclosure are suitable for the display panels of high resolution, such as the display panels have a resolution of greater than 300 ppi (pixel per inch). The embodiments of the disclosure can decrease the number of spacers used in the display panels and increase the aperture ratio of the display panels of high resolution.

In some embodiments, the spacer 107 is a photosensitive-type and column-shaped spacer. In the fabricating process of the spacer 107, a photosensitive material for forming the spacer 107 is coated on the first substrate 101. An exposure and a development process, i.e. a photolithography process, are performed on the photosensitive material to form the spacer 107. In the exposure step, a portion of the photosensitive material near the first substrate 101 and another portion of photosensitive material far away from the first substrate 101 have different exposure amounts by controlling focus and energy of the exposure. As a result, the portion of the photosensitive material near the first substrate 101 removed by the development process is more than that of the photosensitive material far away from the first substrate 101. Thus, the spacer 107 has the undercut structure.

According to some embodiments of the disclosure, the spacer 107 has different widths at different locations in the height of the spacer 107. As shown in FIG. 1, the spacer 107 has a first width W1 and a second width W2 in a direction perpendicular to a normal vector 104 of the top surface 101T of the first substrate 101. The location of the second width W2 in the height of the spacer 107 is nearer to the first substrate 101 than that of the first width W1. Moreover, the second width W2 is smaller than the first width W1.

In some embodiments of the disclosure, the alignment film 109 has a first thickness T1 at the location of the spacer 107 having the first width W1. Also, the alignment film 109 has a second thickness T2 at the location of the spacer 107 having the second width W2. Moreover, the second thickness T2 is greater than the first thickness T1.

According to some embodiments of the disclosure, the portions of the alignment film 109 disposed at different locations have different thicknesses. In some embodiments, a portion of the alignment film 109 covering the top surface of the spacer 107 has a third thickness T3. Another portion of the alignment film 109 covering the planarization layer 113 has a fourth thickness T4. Moreover, the third thickness T3 is much smaller than the fourth thickness T4. In some embodiments, the third thickness T3 is very thin (specifically, the thickness on the top of the main spacer is not easily observed even by a scanning electron microscope (SEM)). In some embodiments, the fourth thickness T4 of the alignment film 109 is in a range of about 20 nm to 70 nm.

In addition, the alignment film 109 covering the planarization layer 113 has different thicknesses at different locations. In some embodiments, a portion of the alignment film 109 covering the planarization layer 113 has a fifth thickness T5 at a location near the spacer 107. Another portion of the alignment film 109 covering the planarization layer 113 has a sixth thickness T6 at a location far away from the spacer 107. The fifth thickness T5 is greater than the sixth thickness T6. In some embodiments, the fifth thickness T5 of the alignment film 109 is in a range of about 30 nm to 100 nm. The sixth thickness T6 of the alignment film 109 is in a range of about 20 nm to 70 nm.

The different thicknesses of the alignment film 109 at different locations are achieved by adjusting the viscosity of the material for forming the alignment film and adjusting the coating thickness of the material for forming the alignment film. In some embodiments, the viscosity of the material for forming the alignment film is low, thus the material for forming the alignment film has good mobility. Moreover, the coating thickness of the material for forming the alignment film is thick. Thus, the alignment film 109 has a large thickness at the location near the bottom of the spacer 107 than the other locations.

According to some embodiments of the disclosure about the thickness designs of the alignment film, the alignment film 109 has a large thickness at the location near the bottom of the spacer 107. The large thickness of the alignment film 109 can compensate for the decrease in the contact area between the spacer 107 and the first substrate 101. The adhesion between the spacer 107 and the first substrate 101 is thereby enhanced. In the embodiments of the disclosure, the alignment film 109 can protect the spacer 107 and prevent the spacer 107 from peeling away from the first substrate 101.

Moreover, according to some embodiments of the disclosure about the thickness designs of the alignment film, the alignment film 109 has a smooth profile at the location near the bottom of the spacer 107. Thus, the rubbing process is easily performed on the alignment film 109. The rubbing process is not affected by the undercut structure of the spacer 107. As a result, trenches are easily produced by the rubbing process on the alignment film 109 at the location near the bottom of the spacer 107. The liquid-crystal molecules at the location near the bottom of the spacer 107 have good alignment. The alignment of the liquid-crystal molecules in the display medium 105 is easily controlled. Therefore, a rubbing mura defect in the display panels is decreased. The quality of the image display of the display panels is thereby improved.

According to some embodiments of the disclosure, a cross-section of the spacer 107 is perpendicular to the top surface 101T of the first substrate 101. The cross-section of the spacer 107 has a maximum width $W_{max}$ and a minimum width $W_{min}$ in a direction parallel to top surface 101T of the first substrate 101. In some embodiments, a ratio of the maximum width $W_{max}$ to the minimum width $W_{min}$ is greater than 1 and smaller than or equal to 1.5. In some embodiments, a ratio of the maximum width $W_{max}$ to the minimum width $W_{min}$ of the spacer 107 is in a range of about 1.02 to about 1.05. Moreover, in some embodiments, the location of the spacer 107 having the maximum width $W_{max}$ is at about 60% to about 90% of the total height $H_T$ of the spacer 107. The location of the spacer 107 having the minimum width $W_{min}$ is at about 0% to about 30% of the total height $H_T$ of the spacer 107. In some embodiments, the maximum width $W_{max}$ of the spacer 107 is in a range of about 5 μm to about 20 μm.

Figure 2:
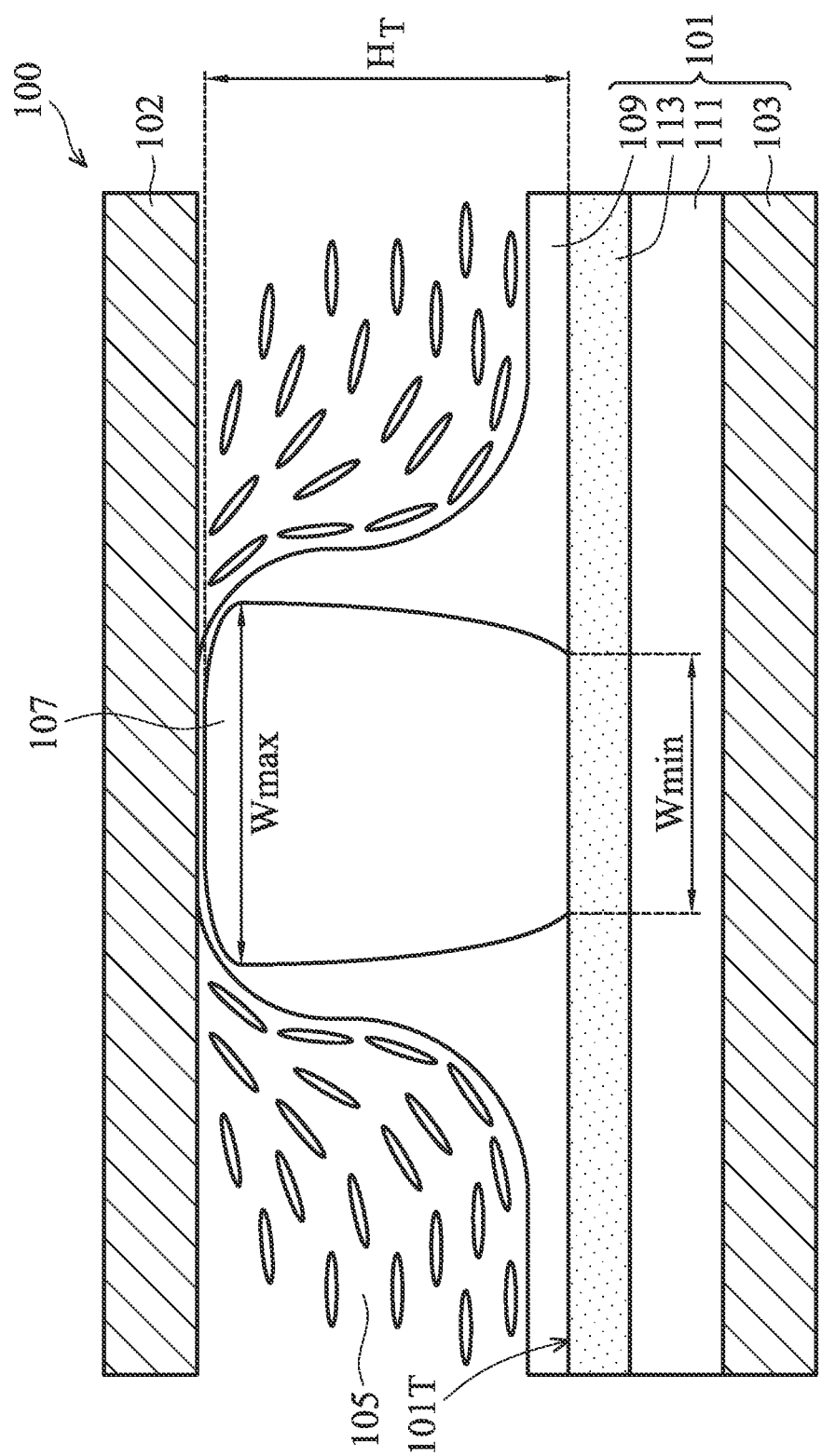

Referring to FIG. 2, a cross section of a display panel 100 according to some embodiments of the disclosure is shown. As shown in FIG. 2, the location of the spacer 107 having the maximum width $W_{max}$ is at about 90% of the total height $H_T$ of the spacer 107. The location of the spacer 107 having the minimum width $W_{min}$ is at about 0% of the total height $H_T$ of the spacer 107.

Figure 3:
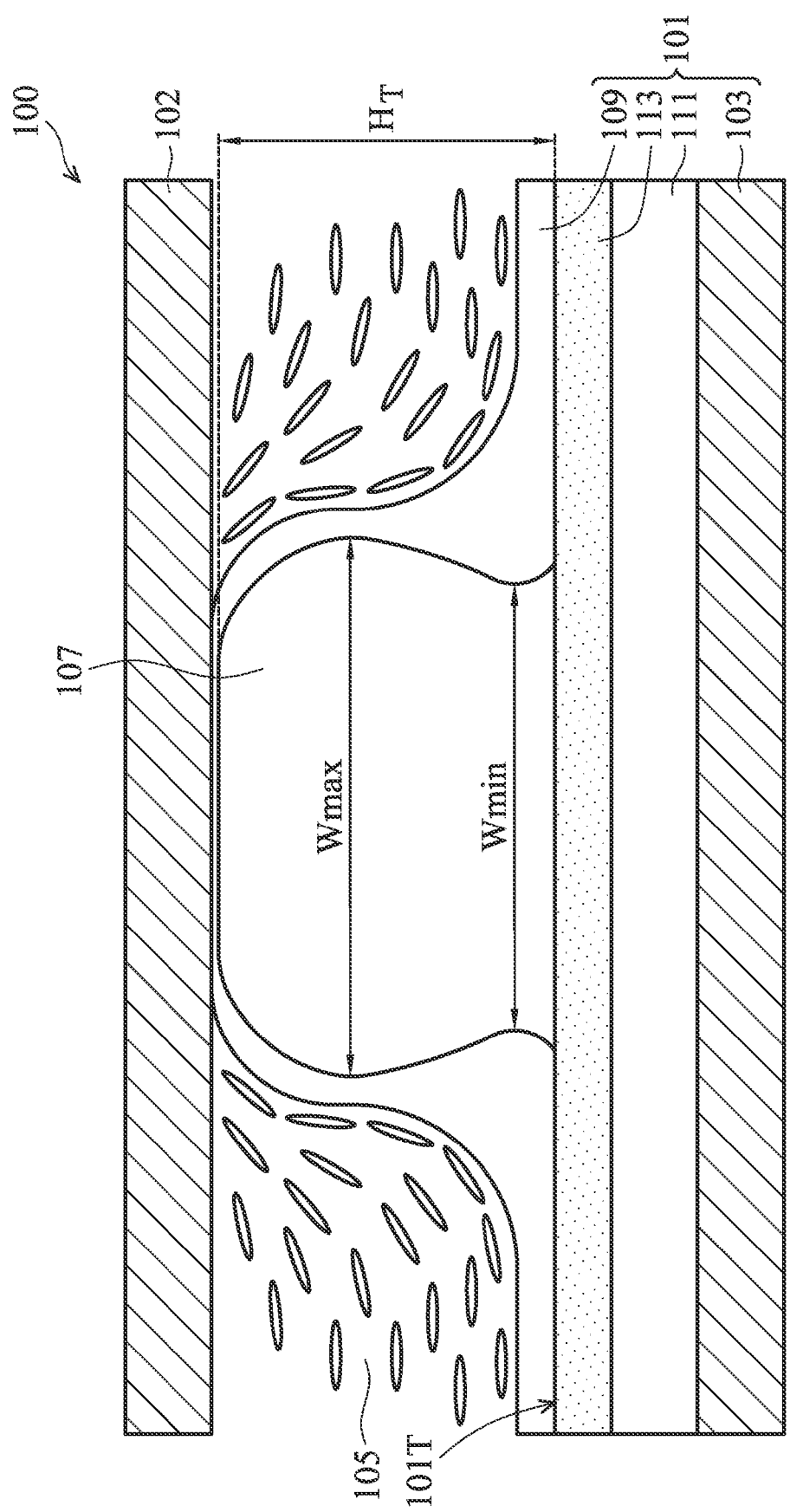

Referring to FIG. 3, a cross section of a display panel 100 according to some other embodiments of the disclosure is shown. As shown in FIG. 3, the spacer 107 has the shape of a strip. Both the maximum width $W_{max}$ and the minimum width $W_{min}$ of the spacer 107 are greater than the total height $H_T$ of the spacer 107. The location of the spacer 107 having the maximum width $W_{max}$ is at about 60% of the total height $H_T$ of the spacer 107. In some embodiments, the maximum width $W_{max}$ of the spacer 107 is in a range of about 5 μm to about 20 μm.

Figure 4:
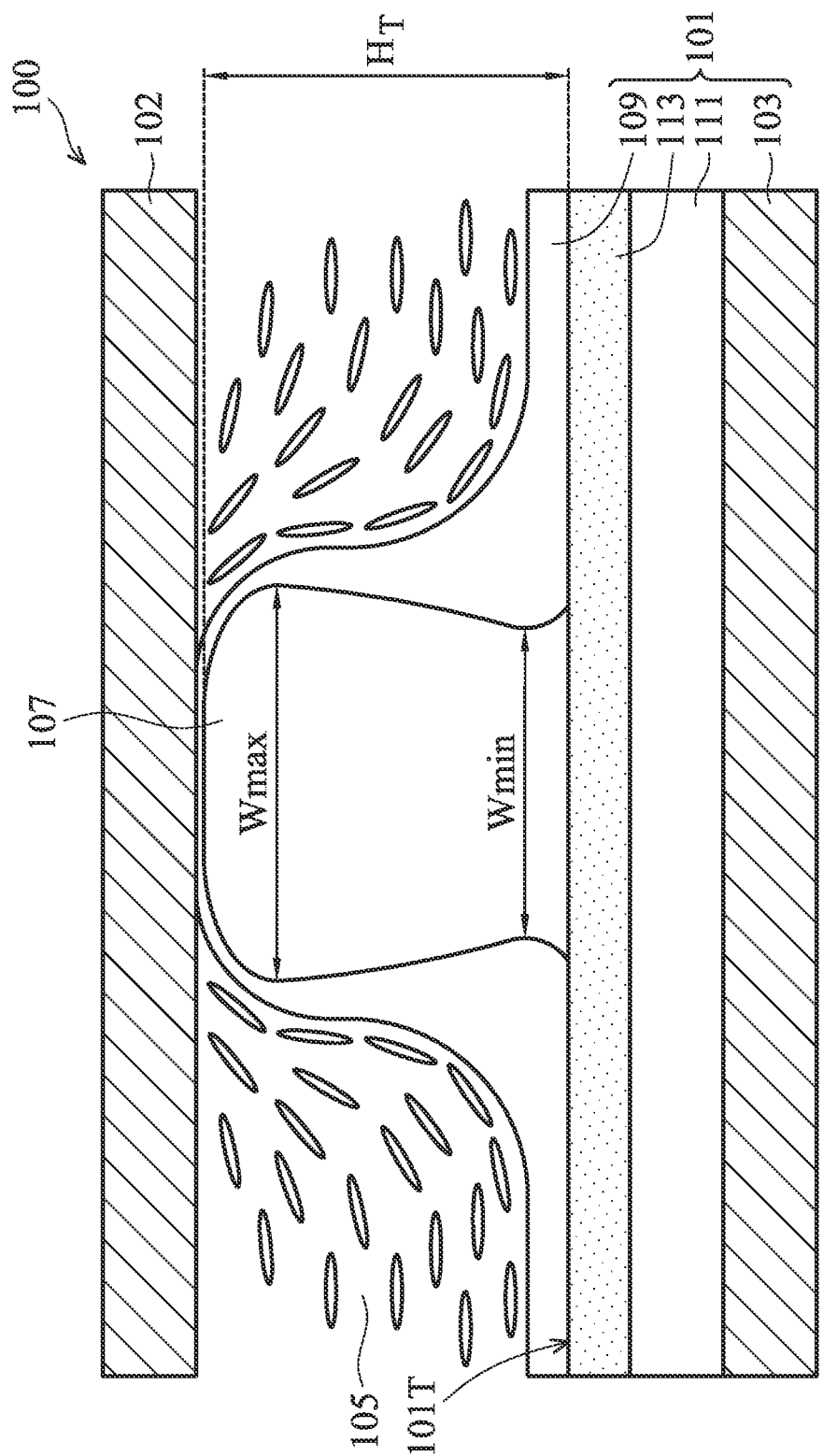

Referring to FIG. 4, a cross section of a display panel 100 according to some other embodiments of the disclosure is shown. As shown in FIG. 4, the location of the spacer 107 having the maximum width $W_{max}$ is at about 80% of the total height $H_T$ of the spacer 107. The location of the spacer 107 having the minimum width $W_{min}$ is at about 15% of the total height $H_T$ of the spacer 107.

Moreover, according to some embodiments of the disclosure, the spacer 107 has a first sectional area at a location near the first substrate 101. The spacer 107 has a second sectional area at a location near the second substrate 102. The first and second sectional areas of the spacer 107 are parallel to the surface of the first substrate 101, and are also parallel to the surface of the second substrate 102. The first sectional area is smaller than the second sectional area. In some embodiments, the sectional areas of the spacer 107 have the shape of a circle, an ellipse, or another suitable shape.

In some other embodiments, the first substrate 101 of the display panel 100 shown in FIG. 1 is a TFT substrate, and the second substrate 102 is a CF substrate. In the embodiments, the spacer 107 with the undercut structure is formed on the TFT substrate. The bottom of the spacer 107 near the TFT substrate shrinks inward. In addition, the alignment film 109 is formed on the TFT substrate and the spacer 107. In the embodiments, the features of the spacer 107 and the alignment film 109 are described as the above mentions, and are not repeated herein.

According to some embodiments of the disclosure, the spacer disposed between the first and second substrates of the display panels has an undercut structure. The undercut structure can increase the elastic recovery of the spacer. Thus, the number of spacers used in the display panels is decreased. The aperture ratio of the display panels is thereby increased. Therefore, the spacers of the embodiments of the disclosure are suitable for the display panels having high resolution.

In addition, according to some embodiments of the disclosure, the alignment film covering the spacer and the first substrate has a large thickness at the location near the undercut structure of the spacer. The thickness designs of the alignment film can prevent the spacer from peeling away from the first substrate. Moreover, the alignment film has a smooth profile through the thickness designs, which is advantageous to the rubbing process performed on the alignment film at the location near the undercut structure of the spacer. As a result, alignment of liquid-crystal molecules in the display medium is easily controlled. The quality of the image display of the display panels is thereby enhanced.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
   a first substrate, having a top surface;
   a second substrate;
   a display medium sandwiched between the first and second substrates;
   at least one spacer disposed on the top surface of the first substrate, and disposed between the first substrate and the second substrate, wherein the spacer has a first width, a second width and a minimum width in a direction perpendicular to a normal vector of the top surface of the first substrate, a location of the second width in a height of the spacer is nearer to the first substrate than a location of the first width in the height of the spacer, and the second width is smaller than the first width, and a location of the minimum width in the height of the spacer is at 0% to 15% of a total height of the spacer; and
   an alignment film formed on the first substrate and covering the spacer, wherein the alignment film has a first thickness at the location of the spacer having the first width and has a second thickness at the location of the spacer having the second width, and the second thickness is greater than the first thickness.

2. The display panel of claim 1, wherein the spacer has a cross-section perpendicular to the top surface of the first substrate, the cross-section has a maximum width and the minimum width in a direction parallel to the top surface of the first substrate, and a ratio of the maximum width to the minimum width is greater than 1 and smaller than or equal to 1.5.

3. The display panel of claim 2, wherein the ratio of the maximum width to the minimum width is in a range of 1.02 to 1.05.

4. The display panel of claim 2, wherein a location of the maximum width in the height of the spacer is at 60% to 90% of the total height of the spacer.

5. The display panel of claim 1, wherein a maximum width of the spacer is in a range of 5 μm to 20 μm.

6. The display panel of claim 1, wherein the spacer has a cross-section perpendicular to the top surface of the first substrate, and the cross-section has the shape of a pillar with a shrinking-inward bottom.

7. The display panel of claim 1, further comprising a planarization layer formed on the first substrate, wherein the planarization layer is disposed between the spacer and the first substrate, and is also disposed between the alignment film and the first substrate.

8. The display panel of claim 7, wherein a portion of the alignment film covering the top surface of the spacer has a third thickness, another portion of the alignment film covering the planarization layer has a fourth thickness, and the third thickness is smaller than the fourth thickness.

9. The display panel of claim 7, wherein a portion of the alignment film covering the planarization layer has a fifth thickness at a location near the spacer, the portion of the alignment film covering the planarization layer has a sixth thickness at a location far away from the spacer, and the fifth thickness is greater than the sixth thickness.

10. The display panel of claim 1, wherein the spacer has a first sectional area at a location near the first substrate and has a second sectional area at a location near the second substrate, the first and second sectional areas are parallel to the top surface of the first substrate, and the first sectional area is smaller than the second sectional area.

* * * * *